United States Patent [19]
Wong

[11] Patent Number: 5,278,589
[45] Date of Patent: Jan. 11, 1994

[54] SINGLE PASS COLOR PRINTER

[75] Inventor: Lam F. Wong, Fairport, N.Y.

[73] Assignee: Xerox Corporation, Stamford, Conn.

[21] Appl. No.: 971,107

[22] Filed: Nov. 4, 1992

[51] Int. Cl.$^5$ .................. G01D 15/14; G01D 9/42; G03G 15/01
[52] U.S. Cl. .................. 346/160; 346/108; 346/157; 355/327
[58] Field of Search .......... 346/157, 160, 108; 355/327

[56] References Cited

U.S. PATENT DOCUMENTS

| | | | |
|---|---|---|---|
| 4,761,046 | 8/1988 | Funato | 350/3.71 |
| 4,847,642 | 7/1989 | Murayama et al. | 346/157 |
| 4,912,491 | 3/1990 | Hoshino et al. | 346/160 |
| 4,916,547 | 4/1990 | Katsumata et al. | 358/300 |
| 5,069,758 | 12/1991 | Herbert et al. | 205/73 |

FOREIGN PATENT DOCUMENTS 62-308682  6/1989  Japan .

Primary Examiner—George H. Miller, Jr.

[57] ABSTRACT

A single pass tandem color printer is disclosed which utilizes a plurality of Raster Output Scan (ROS) systems mounted within a common housing. The ROS systems produce a plurality of scanning beams which emerge from the housing along parallel paths. Each scanning beam is incident on the surface of an associated photoreceptor drum at a non-normal angle of incidence greater than zero to eliminate the reflections back along the optical path which may be present in conventional tandem scanning systems.

3 Claims, 2 Drawing Sheets

SINGLE PASS COLOR PRINTER

BACKGROUND OF THE INVENTION AND PRIOR ART STATEMENT

This invention relates to a single pass color printer and, more particularly, to a printer which uses a plurality of laser beams applied to a common scanning mechanism and directed therefrom onto separate exposure areas of a plurality of photoreceptor drums.

Reproducing or copying color originals through a xerographic process has, in the past, entailed the sequential production of three color separation images of the colored original, with independent development thereof by cyan, magenta and yellow toners. The images so formed are transferred onto the copy substrate material in registered overlaying relationship, with the resulting composite color image being fused to provide a permanent full color reproduction of the original.

In the aforedescribed color process, black is obtained through an amalgam of the three color toners. However, it is often useful to provide a separate processing unit devoted solely to black. Because of the need to process three and possibly four color separation images for each copy, the copy output is often very low. Where a single photoconductive drum is used, for example, normally each color separation image is created, developed and transferred to the copy substrate material before the next is started.

In order to increase the throughput of printers producing multilayer images, single pass, multiple exposure systems have been developed and are known in the art. There are a variety of methods known for creating multiple ROS single pass color printer architectures. A desirable configuration, because of the high throughput, is the tandem system where multiple exposures are simultaneously produced on separate photoreceptor drums. Each exposure is developed by a dedicated development system and transferred, in registration, to a transfer image belt from which the transfer image is then transferred, in turn, to an output sheet and then fused. In yet another tandem embodiment, each developed image is successively transferred directly to a copy sheet being transported by a transfer belt. For example, U.S. Pat. Nos. 4,847,642; 4,912,491; and 4,916,547 disclose single pass color systems utilizing four separate exposure stations associated with four photoreceptor drums. Each exposure station includes a dedicated optical system consisting of a laser, polygon scanner and beam shaping optics. Each exposure is developed on an associated photoreceptor drum and transferred sequentially to a copy sheet passing along a common transfer station.

Ricoh publication 1-151370 discloses a tandem architecture where dual optical systems are symmetrically located 180° apart from two separate polygons mounted on a common shaft. Thus, four beams are generated with two parallel beams being reflected from one side of the polygon and two beams from the other side.

Ricoh U.S. Pat. No. 4,761,046 discloses another tandem system which teaches four separate optical exposure stations utilizing a single holographic spinner member. The scanning beams are directed to different sectors of the spinner and diffracted therefrom to expose the associated photoreceptor drum.

In the prior art systems, if the beams from the imaging systems are directed at a zero angle of incidence, beam reflections back along the scanning path would result in interference and could lead to possible damage to the laser diode. It is known in the prior art to design the exposure system so that the beam striking the photoreceptor is directed at some small angle, typically one or two degrees. A problem with this design approach is the complexity of the design and the alignment and maintenance required to maintain this small angle of incidence. An associated problem in adjusting the beam tilt is the associated moving of the impinging point on the photoreceptor.

According to the present invention, multiple beams are generated by a plurality of ROS units located in a common housing and directed to the surface of a plurality of associated photoreceptor drums. The entire housing is offset with respect to the photoreceptor drums so that the scanning beams emerging from the housing are at right angles to the housing and along parallel paths, the paths being offset a small distance from the center line of the drum resulting in non-normal incidence of the beam on the drum surface. Beam reflection from the drum surface is not directed back along the scanning optical path, thereby alleviating the problem associated with the prior art. More particularly, the present invention relates to an imaging system for forming color image exposures on a plurality of photoreceptor drums rotating in the same direction at the same rotational speed, said system including:

a plurality of Raster Output Scanners (ROS) units, each ROS unit generating image-modulated scanning beams, wherein said scanning beams are transmitted along parallel optical paths to expose the surfaces of associated photoreceptor drums, the improvement wherein said scan beams being transmitted along said optical paths are incident at the surface of the associated photoreceptor drums at a non-normal angle of incidence $\theta$, said scan angle $\theta$ greater than 0.

DESCRIPTION OF THE INVENTION

Figure 1:
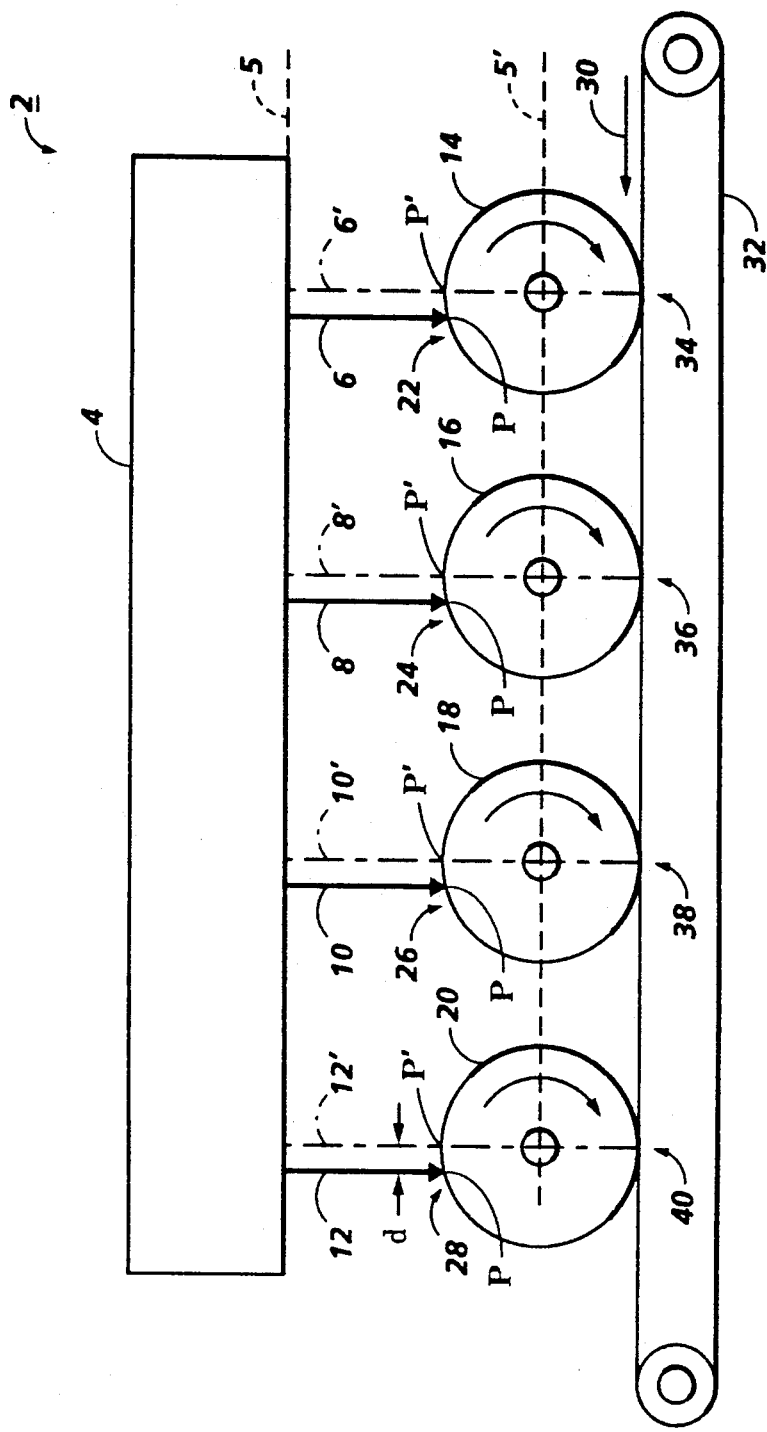
FIG. 1 shows a side view of an imaging system which includes a Raster Output Scanner (ROS) housing with the outputs from the individual ROSs incident on four photoreceptor drums at non-normal angles of incidence.

FIG. 1 shows a single pass ROS color printing system 2, which includes a housing 4 containing four conventional Raster Output Scanner (ROS) units. Housing 4 is positioned so that the bottom surface is aligned along horizontal plane 5. Each unit generates an output scanning beam 6, 8, 10 and 12, these beams emerging at right angles from the housing (perpendicular to plane 5) and travelling along parallel optical paths. The beams are incident at each associated drum at the same location represented by incident points P. Scanning beams 6', 8', 10', 12' are shown in dotted form to represent paths which may have been followed by the scanning beam in a prior art configuration. As shown, these paths would have passed through the center of each drum and would have been normal to a tangential plane at a point of incidence P'. The beam angle of incidence for this case would be zero. The actual scan beams, 6, 8, 10, 12, are modulated in accordance with color information signals so as to form color images on drums 14, 16, 18, 20.

Drums 14, 16, 18, 20 are positioned so that the drum centers are aligned along a common horizontal plane 5', which is parallel to plane 5. Thus, at exposure stations 22, 24, 26, 28, for example, yellow, magenta, cyan and black color images, respectively, are formed. Each drum has a charging means upstream of the exposure station and a developing station containing the appropriate color toner downstream from the exposure station. Each developed image is successively transferred to a copy sheet 30 being transported from right to left in the figure by a transfer belt 32. The copy sheet receives the yellow, magenta, cyan and black developed images at transfer stations 34, 36, 38, 40, respectively, to form a full color image. The copy sheet with the full color image is then separated from belt 32. Further details of xerographic stations and conventional ROS units are described, for example, in U.S. Pat. Nos. 4,847,642 and 4,761,046, whose contents are hereby incorporated by reference.

Figure 2:
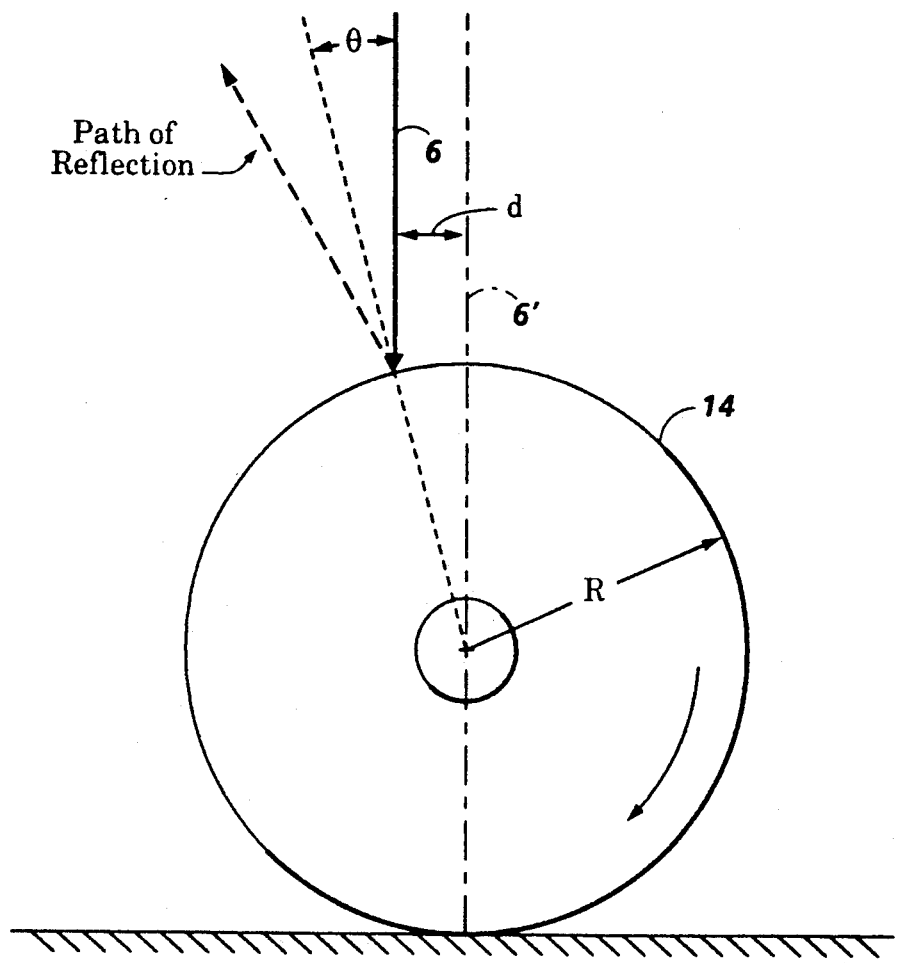
FIG. 2 shows an enlarged view of one of the scanning beams incident on the associated photoreceptor drum at the non-normal angle of incidence.

According to the principles of the present invention, the scanning beams 6, 8, 10 and 12 are incident on the surface of the associated drum at an offset angle $\theta$, without the need to tilt the beams as in the prior art. FIG. 2 shows scanning beam 6 striking the drum 14 at a non-normal angle of incidence $\theta$, thereby causing the reflected light to be harmlessly reflected along the dotted path. Angle $\theta$ is measured between a plane passing through the center of each drum and the point of incidence P of each scan beam and a plane passing through the center of the drum and and perpendicular planes 5 and 5'. This non-normal angle of incidence $\theta$ is enabled by positioning ROS unit 4 at an offset with respect to the photoreceptor drum such that a distance "d" (see FIG. 1) separates the optical path of beam 6 (and beams 8, 10, 12) with the conventional, normally incident optical path 6' (and 8', 10', 12'). Alternatively, exposure path 6' is defined by a plane extending through the center of the drum and normal to the surface. An optimum value of d has been determined to be a function of the drum radius and the incident angle $\theta$ or, $d = R \sin \theta$ or approximately, for a small value of $\theta$,
$d = R\theta$ As is evident, $\theta$ is directly proportional to d. As one example, for a value of $\theta$ of 2° (or 35 milliradians), and a radius R of 60 mm, the required offset d is approximately 2 mm. A range of values for $\theta$ would be between $2° \pm \frac{1}{2}°$, depending on system requirements. A range of values for the value d would be 2 mm, ±0.5 mm. For some systems, fine adjustments may be made with the individual ROS systems by appropriate transmission of the scanning beam in the process (drum rotational) direction, by movement of an optical component such as a mirror, as is known in the art. Although four ROS beams are shown in the illustrated embodiment, fewer numbers of ROS beams may be used. For example, for a highlight color system, one or two colors, such as magenta and cyan, as well as black, would be used. The invention is therefore not limited solely to the four ROS, full color system displayed.

While the invention has been described with reference to the structures disclosed, it is not confined to the details set forth, but is intended to cover such modifications or changes as they come within the scope of the following claims.

What is claimed is:

1. An imaging system for forming color image exposures on a plurality of photoreceptor drums rotating in the same direction at the same rotational speed, said system including:
   a plurality of Raster Output Scanners (ROS) units, each ROS unit generating image-modulated scanning beams, wherein said scanning beams are transmitted along parallel optical paths to expose the surfaces of associated photoreceptor drums, the improvement wherein said scan beams being transmitted along said optical paths are incident at the surface of the associated photoreceptor drums at a non-normal angle of incidence $\theta$, said scan angle $\theta$ greater than 0.

2. The imaging system of claim 1 wherein each of said photoreceptor members has a radius R and wherein each of said parallel optical paths is separated from a plane parallel to the scanning beam optical path and passing through the center of each drum normal to the drum surface by a distance d, and wherein the relationship between d, angle $\theta$ and R is given by the expression:

$d = R \sin \theta$.

3. An imaging system for forming color image exposures on a plurality of photoreceptor drums in a single pass system including:
   a plurality of Raster Output Scanners (ROS) units, said ROS units contained within a housing frame having a bottom surface aligned in a horizontal plane, each of said ROS units generating image modulated scanning beams which are transmitted along parallel optical paths normal to the horizontal plane,
   a plurality of photoreceptor drums aligned along a horizontal plane parallel to said housing horizontal plane, each of said drums associated with one each of said ROS units,
   means for directing said image modulated scanning beams from each ROS unit along said parallel optical paths to the surface of said associated drums,
   the improvement wherein said scan beams being transmitted along said optical paths are incident at the surface of the associated member at a non-normal angle of incidence $\theta$ and at a point of incidence P, $\theta$ measured between a plane passing through the center of each drum and the point of incidence P of each scan beam and a plane passing through the center of each drum and perpendicular to said parallel horizontal planes.

* * * * *